United States Patent
Dienst et al.

(10) Patent No.: US 9,699,951 B2
(45) Date of Patent: Jul. 11, 2017

(54) WHEEL POSITION CONTROL SYSTEM FOR AN AGRICULTURAL IMPLEMENT

(71) Applicant: CNH Industrial America LLC, New Holland, PA (US)

(72) Inventors: Johnathon R. Dienst, Dekalb, IL (US); Michael J. Connors, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 60 days.

(21) Appl. No.: 14/796,841

(22) Filed: Jul. 10, 2015

(65) Prior Publication Data

US 2017/0006758 A1    Jan. 12, 2017

(51) Int. Cl.
*A01B 63/22*    (2006.01)
*A01B 63/00*    (2006.01)
*A01C 7/20*    (2006.01)

(52) U.S. Cl.
CPC ............ *A01B 63/22* (2013.01); *A01B 63/002* (2013.01); *A01C 7/208* (2013.01)

(58) Field of Classification Search
CPC ..... A01B 63/00; A01B 63/002; A01B 63/008; A01B 63/111; A01B 63/1115; A01B 63/16; A01B 63/22; A01B 33/087
See application file for complete search history.

(56) References Cited

U.S. PATENT DOCUMENTS

| 3,584,691 | A | * | 6/1971 | Reynolds | ............... | A01B 63/22 |
| | | | | | | 172/239 |
| 4,346,763 | A | | 8/1982 | Swanson et al. | | |
| 4,427,207 | A | * | 1/1984 | Gafford | ................. | A01B 63/22 |
| | | | | | | 172/401 |
| 4,519,460 | A | | 5/1985 | Gust | | |

(Continued)

FOREIGN PATENT DOCUMENTS

| WO | 2012125109 | 9/2012 |
| WO | 2013112929 | 8/2013 |

OTHER PUBLICATIONS http://www..kinze.com/filesimages/Literature/4900.pdf, Kinze 4900 Planter, Kinze Manufacturing, Inc., pp. 1-36, accessed May 26, 2015.

*Primary Examiner* — Robert Pezzuto
*Assistant Examiner* — Adam Behrens
(74) *Attorney, Agent, or Firm* — Rebecca L. Henkel; Rickard K. DeMille

(57) ABSTRACT

An agricultural implement system includes a toolbar assembly configured to support multiple row units, and multiple wheels configured to support the toolbar assembly. The wheels include a first wheel and a second wheel, and at least one row unit is configured to be disposed between the first wheel and the second wheel. The agricultural implement system also includes a wheel position control system configured to instruct first and second actuators to lower the first wheel and the second wheel to transition the agricultural (Continued)

implement system to a non-working position, to instruct the first and second actuators to raise the first wheel and the second wheel to transition the agricultural implement system to a working position, and to instruct the second actuator to raise the second wheel while the agricultural implement system is in the working position such that the second wheel is disengaged from a soil surface.

16 Claims, 4 Drawing Sheets

(56) References Cited

U.S. PATENT DOCUMENTS

| | | | |
|---|---|---|---|
| 4,582,143 A * | 4/1986 | Pratt | A01B 73/005 172/311 |
| 4,927,165 A * | 5/1990 | Murray | A01B 73/005 280/43.23 |
| 5,031,550 A | 7/1991 | Neal | |
| 5,685,245 A | 11/1997 | Bassett | |
| 6,408,950 B1 | 6/2002 | Shoup | |
| 7,021,720 B1 | 4/2006 | Yeggy | |
| 8,141,652 B2 * | 3/2012 | Poole | A01B 73/065 172/311 |
| 2006/0090910 A1 | 5/2006 | Houck | |
| 2008/0053351 A1 * | 3/2008 | Bettin | A01B 73/065 111/52 |
| 2011/0284252 A1 | 11/2011 | Friggstad et al. | |
| 2012/0032005 A1 | 2/2012 | McMahon et al. | |
| 2012/0261145 A1 * | 10/2012 | Palen | A01B 63/22 172/1 |
| 2014/0096983 A1 * | 4/2014 | Blackwell | A01C 7/08 172/1 |
| 2014/0190711 A1 * | 7/2014 | Horsch | A01B 49/027 172/1 |
| 2015/0156951 A1 * | 6/2015 | Henry | A01B 63/22 172/664 |

* cited by examiner

WHEEL POSITION CONTROL SYSTEM FOR AN AGRICULTURAL IMPLEMENT

BACKGROUND

The invention relates generally to a wheel position control system for an agricultural implement.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a desired depth beneath the soil surface of a field, thereby establishing rows of planted seeds. For example, each row unit typically includes a ground engaging tool or opener that forms a seeding path (e.g., trench) for seed deposition into the soil. The opener is followed by a seed tube configured to direct seeds and/or other agricultural products (e.g., fertilizer, etc.) into the trench. Closing discs may be positioned behind the seed tube for moving the soil back into the trench, and/or a packer wheel may be coupled to a rear portion of the row unit to pack the soil on top of the deposited seeds.

In certain seeding implements, the row units are mounted along a toolbar assembly. Certain toolbar assemblies are supported by multiple ground engaging wheels (e.g., positioned at a central portion of the toolbar assembly and at distal ends of the toolbar assembly). The ground engaging wheels may be configured to support the toolbar assembly while the toolbar assembly is in a lowered/working position and in a raised/non-working position (e.g., for turning at a headland). In certain toolbar assemblies, a first ground engaging wheel is positioned on one lateral side of one row unit, and a second ground engaging wheel is positioned on an opposite lateral side of the row unit (e.g., proximate to a distal end of the toolbar assembly). Unfortunately, the ground engaging wheels may compact the soil on both lateral sides of the row unit, a condition which may be known as a pinch row. As a result, the crop yield from the seeds planted by the row unit positioned between the ground engaging wheels may be reduced, thereby decreasing the efficiency of the seeding process.

BRIEF DESCRIPTION

In one embodiment, an agricultural implement system includes a toolbar assembly configured to support multiple row units, and multiple wheels configured to support the toolbar assembly above a soil surface. The wheels include a first wheel and a second wheel, and at least one row unit is configured to be disposed between the first wheel and the second wheel. The agricultural implement system also includes a wheel position control system configured to control movement of each wheel relative to the toolbar assembly. The wheel position control system is configured to instruct a first actuator and a second actuator to lower the first wheel and the second wheel, respectively, relative to the toolbar assembly to transition the agricultural implement system to a non-working position, in which the first and second wheels engage the soil surface and the row units are disengaged from the soil surface, the wheel position control system is configured to instruct the first actuator and the second actuator to raise the first wheel and the second wheel, respectively, relative to the toolbar assembly to transition the agricultural implement system to a working position, in which the first wheel engages the soil surface and the row units engage the soil surface, and the wheel position control system is configured to instruct the second actuator to raise the second wheel above the first wheel relative to the toolbar assembly while the agricultural implement system is in the working position such that the second wheel is disengaged from the soil surface.

In another embodiment, an agricultural implement system includes a wheel position control system configured to control respective positions of a first wheel and a second wheel of the agricultural implement system. The first wheel is positioned on a first side of at least one row unit, the second wheel is positioned on a second side of the at least one row unit, opposite the first side, the first and second wheels are configured to support a toolbar assembly, and the at least one row unit is coupled to the toolbar assembly. Furthermore, the wheel position control system includes an electronic controller configured to instruct a first actuator and a second actuator to lower the first wheel and the second wheel, respectively, to transition the agricultural implement system to a non-working position, in which the first and second wheels engage a soil surface and the at least one row unit is disengaged from the soil surface, the electronic controller is configured to instruct the first and second actuators to raise the first and second wheels, respectively, to transition the agricultural implement system to a working position, in which the first wheel engages the soil surface and the at least one row unit engages the soil surface, and the electronic controller is configured to instruct the second actuator to raise the second wheel above the first wheel while the agricultural implement system is in the working position such that the second wheel is disengaged from the soil surface.

In a further embodiment, an agricultural implement system includes a toolbar assembly configured to support multiple row units. The agricultural implement system also includes a first wheel configured to support the toolbar assembly above a soil surface, a first wheel frame rotatably coupled to the toolbar assembly and configured to support the first wheel, and a first actuator configured to adjust a first angle of the first wheel frame relative to the toolbar assembly. In addition, the agricultural implement system includes a second wheel configured to support the toolbar assembly above the soil surface, and at least one row unit is positioned between the first wheel and the second wheel. The agricultural implement system further includes a second wheel frame rotatably coupled to the toolbar assembly and configured to support the second wheel, and a second actuator configured to adjust a second angle of the second wheel frame relative to the toolbar assembly. The agricultural implement system also includes a wheel position control system having an electronic controller. The electronic controller is configured to instruct the first actuator and the second actuator to lower the first wheel and the second wheel, respectively, relative to the toolbar assembly to transition the agricultural implement system to a non-working position, in which the first and second wheels engage the soil surface and the at least one row unit is disengaged from the soil surface, the electronic controller is configured to instruct the first and second actuators to raise the first and second wheels, respectively, relative to the toolbar assembly to transition the agricultural implement system to a working position, in which the first wheel engages the soil surface and the at least one row unit engages the soil surface, and the electronic controller is configured to instruct the second actuator to raise the second wheel above the first wheel while the agricultural implement system is in the working position such that the second wheel is disengaged from the soil surface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
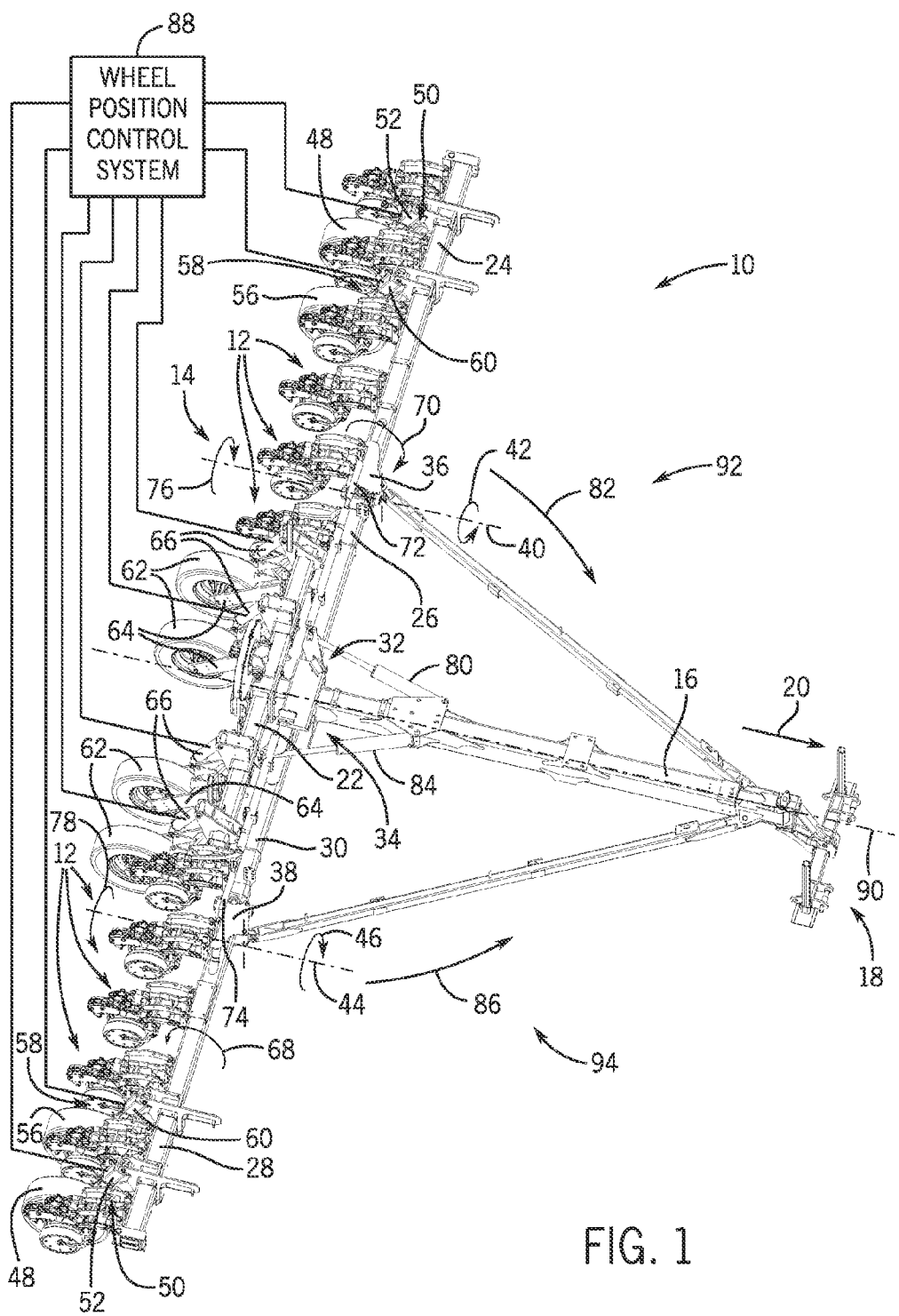
FIG. 1 is a perspective view of an embodiment of an agricultural implement system configured to deposit seeds into soil.

Turning now to the drawings, FIG. 1 is a perspective view of an embodiment of an agricultural implement system 10 configured to deposit seeds into soil. In the illustrated embodiment, the agricultural implement system 10 includes row units 12 configured to open the soil, dispense seeds into the soil opening, and re-close the soil as the agricultural implement system 10 moves through a field. For example, in certain embodiments, each row unit 12 includes a ground engaging tool or opener that forms a seeding path (e.g., trench) for seed deposition into the soil. The opener is followed by a seed tube configured to direct seeds and/or other agricultural products (e.g., fertilizer, etc.) into the trench. Closing discs may be positioned behind the seed tube for moving the soil back into the trench, and/or a packer wheel may be coupled to a rear portion of the row unit to pack the soil on top of the deposited seeds. While the agricultural implement system 10 includes 16 row units 12 in the illustrated embodiment, it should be appreciated that in alternative embodiments, the agricultural implement system may include more or fewer row units. For example, in certain embodiments, the agricultural implement system may include 6, 8, 10, 12, 14, 15, 16, 18, 20, 22, 23, 24, or more row units.

As illustrated, the row units 12 are coupled to a toolbar assembly 14. The toolbar assembly 14, in turn, is coupled to a tow bar assembly 16, which includes a hitch assembly 18. The hitch assembly 18 is configured to couple the agricultural implement system 10 to a tow vehicle, such as a tractor or other prime mover. Accordingly, the tow vehicle may move the agricultural implement system 10 across a field in a direction of travel 20. As discussed in detail below, the tow bar assembly 16 is configured to elongate as wings of the toolbar assembly rotate from the illustrated working position toward a transport position.

In the illustrated embodiment, the toolbar assembly 14 includes a central toolbar 22, a first wing toolbar 24, a first wing support 26, a second wing toolbar 28, and a second wing support 30. The central toolbar 22 is rigidly coupled to the tow bar assembly 16, and the central toolbar 22 is configured to support four row units 12. However, it should be appreciated that the central toolbar may be configured to support more or fewer row units in alternative embodiments. The first and second wing supports 26 and 30 are pivotally coupled to the tow bar assembly 16 by first and second pivot joints 32 and 34, respectively. As discussed in detail below, the first and second pivot joints 32 and 34 enable the wing toolbars and the wing supports to rotate forwardly from the illustrated working position to a transport position. In the illustrated embodiment, one row unit 12 is coupled to each wing support. However, it should be appreciated that in alternative embodiments, more or fewer row units (e.g., 0, 1, 2, 3, 4, or more) may be coupled to each wing support. The first wing toolbar 24 is pivotally coupled to the first wing support 26 by a third pivot joint 36, and the second wing toolbar 28 is pivotally coupled to the second wing support 30 by a fourth pivot joint 38. The third and fourth pivot joints 36 and 38 enable the toolbar assembly 14 to bend in response to variations in the surface of the soil. In the illustrated embodiment, five row units 12 are coupled to each wing toolbar. However, it should be appreciated that more or fewer row units (e.g., 1, 2, 3, 4, 5, 6, 8, 10, or more) may be coupled to each wing toolbar in alternative embodiments.

While the toolbar assembly 14 is in the illustrated lowered/working position and the wing toolbars are in the illustrated working position, the row units 12 (e.g., ground-engaging elements of the row units, such as gauge wheels, openers, closing discs, packers wheels, etc.) are configured to engage the soil, thereby facilitating planting/seeding operations. In the illustrated embodiment, the toolbar assembly 14 is configured to bend at the third and fourth pivot joints 36 and 38 in response to variations in the surface of the soil. Accordingly, the row units 12 may maintain engagement with the soil as the agricultural implement system 10 encounters varying contours within the field. In the illustrated embodiment, the first wing toolbar 24 is configured to rotate about a first wing axis 40 relative to the first wing support 26 to enable a portion of the toolbar assembly 14 (e.g., left half of the toolbar assembly 14) to bend in response to variations in the surface of the soil. For example, if row units coupled to the first wing toolbar 24 encounter terrain that is elevated relative to the terrain under the central toolbar 22 and/or under the first wing support 26, the first wing toolbar 24 may rotate in a direction 42 about the axis 40. As a result, the row units 12 coupled to the central toolbar 22, the first wing support 26, and the first wing toolbar 24 may maintain engagement with the soil surface.

In addition, the second wing toolbar 28 is configured to rotate about a second wing axis 44 relative to the second wing support 30 to enable a portion of the toolbar assembly 14 (e.g., right half of the toolbar assembly 14) to bend in response to variations in the surface of the soil. For example, if row units coupled to the second wing toolbar 28 encounter terrain that is elevated relative to the terrain under the central toolbar 22 and/or under the second wing support 30, the second wing toolbar 28 may rotate in a direction 46 about the axis 44. As a result, the row units 12 coupled to the central toolbar 22, the second wing support 30, and the second wing toolbar 28 may maintain engagement with the soil surface. In the illustrated embodiment, the first and second wing axes 40 and 44 are substantially parallel to the direction of travel 20. However, it should be appreciated that in alternative embodiments, the first and second wing axes may be angled relative to the direction of travel (e.g., based on the configuration of the third and fourth pivot joints).

In the illustrated embodiment, the agricultural implement system 10 includes first wheels 48 configured to support the toolbar assembly 14 above the soil surface. One first wheel 48 is coupled to the first wing toolbar 24 by a respective first wheel frame 50, and another first wheel 48 is coupled to the second wing toolbar 28 by a respective first wheel frame 50. Each first wheel frame 50 is rotatably coupled to the respective wing toolbar and rotatably coupled to the respective first wheel 48. A wheel actuator 52 (e.g., first actuator), such as a hydraulic actuator or a hydraulic cylinder, among others, is coupled to each first wheel frame 50 and to the respective wing toolbar (e.g., via a bracket). The wheel actuators 52 are configured to rotate the first wheel frames 50 relative to the respective wing toolbars.

Furthermore, the illustrated agricultural implement system 10 includes second wheels 56 configured to support the toolbar assembly 14 above the soil surface. One second wheel 56 is coupled to the first wing toolbar 24 by a respective second wheel frame 58, and another second wheel 56 is coupled to the second wing toolbar 28 by a respective second wheel frame 58. Each second wheel frame 58 is rotatably coupled to the respective wing toolbar and rotatably coupled to the respective second wheel 56. A wheel actuator 60 (e.g., second actuator), such as a hydraulic actuator or a hydraulic cylinder, among others, is coupled to each second wheel frame 58 and to the respective wing toolbar (e.g., via a bracket). The wheel actuators 60 are configured to rotate the second wheel frames 58 relative to the respective wing toolbars.

In the illustrated embodiment, only one row unit 12 is disposed between the first wheel 48 and the second wheel 56 of the first wing toolbar 24, and only one row unit 12 is disposed between the first wheel 48 and the second wheel 56 of the second wing toolbar 28. However, it should be appreciated that in alternative embodiments, more row units (e.g., 2, 3, 4, or more) may be disposed between the first wheel 48 and the second wheel 56 (e.g., on the first wing toolbar and/or on the second wing toolbar). Furthermore, while each wing toolbar is supported by two wheels in the illustrated embodiment, it should be appreciated that in alternative embodiments, each wing toolbar may be supported by more wheels (e.g., 3, 4, 5, or more).

In the illustrated embodiment, the agricultural implement system 10 also includes four third wheels 62 coupled to the central toolbar 22 by respective third wheel frames 64. The third wheel frames 64 are rotatably coupled to the central toolbar 22 and rotatably coupled to the third wheels 62. A third wheel actuator 66, such as a hydraulic actuator or a hydraulic cylinder, among others, is coupled to each third wheel frame 64 and to the central toolbar 22 (e.g., via a bracket). The third wheel actuators 66 are configured to rotate the third wheel frames 64 relative to the central toolbar 22.

By way of example, with the toolbar assembly 14 in the illustrated lowered/working position, the wheel actuators 52, 60, and 66 may rotate the wheel frames 50, 58, and 64 in the direction 68 (e.g., via extension of hydraulic cylinders), thereby moving the toolbar assembly 14 to a raised/non-working position. Furthermore, with the toolbar assembly 14 in the raised/non-working position, the wheel actuators 52, 60, and 66 may rotate the wheel frames 50, 58, and 64 in the direction 70 (e.g., via retraction of hydraulic cylinders), thereby moving the toolbar assembly 14 to the lowered/working position. With the toolbar assembly 14 in the lowered/working position, the row units 12 (e.g., ground-engaging elements of the row units, such as gauge wheels, openers, closing discs, packers wheels, etc.) may engage the soil. In addition, transitioning the toolbar assembly 14 to the raised/non-working position causes the row units 12 to disengage the soil. The toolbar assembly 14 may be transitioned to the raised position for turning the implement at a headland, or as discussed in detail below, for transitioning the wing toolbars to a transport position.

In the illustrated embodiment, the agricultural implement system 10 includes a first wing actuator 72, such as a hydraulic actuator or a hydraulic cylinder, among others, extending between the first wing support 26 and the first wing toolbar 24. In addition, the agricultural implement system 10 includes a second wing actuator 74, such as a hydraulic actuator or a hydraulic cylinder, among others, extending between the second wing support 30 and the second wing toolbar 28. In certain embodiments and/or operating conditions, the first and second wing actuators 72 and 74 may be transitioned to a float mode while the toolbar assembly 14 is in the lowered/working position, thereby enabling the wing toolbars to rotate in response to variations in the terrain. However, in alternative embodiments and/or operating conditions, the first and second wing actuators 72 and 74 may urge the respective wing toolbars downwardly while the toolbar assembly 14 is in the lowered/working position. For example, the first wing actuator 72 may urge the first wing toolbar 24 to rotate in a direction 76 about the first wing axis 40, thereby urging the row units coupled to the first wing toolbar 24 toward the soil surface. In addition, the second wing actuator 74 may urge the second wing toolbar 28 to rotate in a direction 78 about the second wing axis 44, thereby urging the row units coupled to the second wing toolbar 28 toward the soil surface. By way of example, while the agricultural implement 10 is being operated in certain soil conditions (e.g., soft soil), the first and second wing actuators 72 and 74 may be transitioned to the float mode, and while the agricultural implement 10 is being operated in other soil conditions (e.g., hard soil), the first and second wing actuators 72 and 74 may urge the first and second wing toolbars downwardly.

As previously discussed, the first and second wing toolbars 24 and 28, and the first and second wing supports 26 and 30 are configured to rotate between the illustrated working position and a transport position. As illustrated, with the wing toolbars and wing supports in the illustrated working position, the first wing toolbar 24, the first wing support 26, the second wing toolbar 28, and the second wing support 30 are substantially perpendicular to the direction of travel 20. As disclosed herein, "substantially perpendicular" refers to an arrangement in which the wing toolbar and wing support are angled about 45 degrees to about 135 degrees, about 55 degrees to about 125 degrees, about 65 degrees to about 115 degrees, about 75 degrees to about 105 degrees, about 85 degrees to about 95 degrees, or about 90 degrees relative to the direction of travel 20. In the illustrated embodiment, the agricultural implement system 10 includes a first wing support actuator 80, such as a hydraulic actuator or hydraulic cylinder, among others, extending between the tow bar assembly 16 and the first wing support 26. The first wing support actuator 80 is configured to rotate the first wing support 26 and the first wing toolbar 24 forwardly in a direction 82 about the first pivot joint 32 (e.g., via retraction of a hydraulic cylinder). In addition, the agricultural implement system 10 includes a second wing support actuator 84, such as a hydraulic actuator or hydraulic cylinder, among others, extending between the tow bar assembly 16 and the second wing support 30. The second wing support actuator 84 is configured to rotate the second wing support 30 and the second wing toolbar 28 forwardly in a direction 86 about the second pivot joint 34 (e.g., via retraction of a hydraulic cylinder).

By way of example, to transition the first wing toolbar 24, the first wing support 26, the second wing toolbar 28, and the second wing support 30 to the transport position, the wheel actuators 52, 60, and 66 move the toolbar assembly 14 to the raised/non-working position, thereby disengaging the row units from the soil. The wing support actuators 80 and 84 then rotate the first wing toolbar 24, the first wing support 26, the second wing toolbar 28, and the second wing support 30 forwardly to the transport position. As the wing toolbars and the wing supports rotate forwardly, the tow bar 16 elongates to accommodate the length of the wing toolbars and the wing supports. Furthermore, to transition the first wing toolbar 24, the first wing support 26, the second wing toolbar 28, and the second wing support 30 to the working position, the wing support actuators 80 and 84 rotate the first and second wing toolbars and the first and second wing supports rearwardly to the working position. The wheel actuators 52, 60, and 66 then move the toolbar assembly 14 to the lowered/working position, thereby driving the row units to engage the soil.

In the illustrated embodiment, the agricultural implement system 10 includes a wheel position control system 88 configured to control movement of the first wheels 48, the second wheels 56, and the third wheels 62 relative to the toolbar assembly 14. For example, the wheel position control system 88 may instruct the first actuators 52, the second actuators 60, and the third actuators 66 to lower the first, second, and third wheels 48, 56, and 62 (e.g., via rotation of the first wheel frames 50, the second wheel frames 58, and the third wheel frames 64 in the direction 68), thereby moving the toolbar assembly 14 to the non-working position. With the toolbar assembly 14 in the non-working position, the first, second, and third wheels 48, 56, and 62 engage the soil surface, and the row units 12 are disengaged from the soil surface. In addition, the wheel position control system 88 may instruct the first, second, and third actuators 52, 60, and 66 to raise the first, second, and third wheels 48, 56, and 62 (e.g., via rotation of the first wheel frames 50, the second wheel frames 58, and the third wheel frames 64 in the direction 70), thereby moving the toolbar assembly 14 to the working position. The wheel position control system 88 may also instruct the second actuators 60 to raise the second wheels 56 above the first wheels 48 (e.g., via rotation of the second wheel frames 58 in the direction 70) while the toolbar assembly 14 is in the working position such that the second wheels 56 are disengaged from the soil surface. Accordingly, with the toolbar assembly in the working position, the row units 12, the first wheels 48, and the third wheels 62 engage the soil surface.

Because the wheel position control system 88 is configured to instruct the second actuators 60 to raise the second wheels 56 off the ground while the toolbar assembly 14 is in the working position, soil compaction on both lateral sides of each row unit positioned between a pair of adjacent first and second wheels, a condition which may be known as a pinch row, may be substantially reduced or eliminated. Accordingly, the crop yield from the seeds planted by such row units may be increased. As a result, the overall seeding efficiency of the agricultural implement system may be enhanced.

In certain embodiments, the agricultural implement system 10 includes one or more sensors configured to output a signal indicative of soil softness. In such embodiments, the wheel position control system 88 is configured to selectively instruct the second actuators 60 to lower the second wheels 56 into engagement with the soil surface while the toolbar assembly 14 is in the working position and a soil softness exceeds a soil softness threshold value. As a result, the possibility of the first wheels 48, the third wheels 62, and the row units 12 sinking into soft soil may be substantially reduced. Furthermore, the wheel position control system 88 may be configured to instruct the second actuators 60 to control a down force on the second wheels 56 based on the soil softness while the soil softness exceeds the soil softness threshold value. Accordingly, the second wheels 56 may apply a force to the soil surface sufficient to reduce the possibility of the first wheels 48, the third wheels 62, and the row units 12 sinking into the soil, while substantially reducing soil compaction on both lateral sides of each row unit positioned between a pair of adjacent first and second wheels.

In the illustrated embodiment, each second wheel 56 and second wheel frame 58 is positioned closer to a centerline 90 of the agricultural implement system 10 than the adjacent first wheel 48 and first wheel frame 50. As illustrated, the centerline 90 extends along the direction of travel 20 between a left lateral portion 92 and a right lateral portion 94 of the agricultural implement system 10. Accordingly, the wheel position control system 88 is configured to raise the wheels laterally inward from the row units positioned between adjacent wheel. However, it should be appreciated that in alternative embodiments, the wheel position control system 88 may be configured to raise wheels laterally outward from the row units positioned between adjacent wheels. For example, in certain embodiments, the second wheels (e.g., the wheels configured to be raised by the wheel position control system while the toolbar assembly is in the working position) may be positioned farther from the centerline 90 than the first wheels.

While the illustrated embodiment includes two wing toolbars, i.e., the first wing toolbar 24 and the second wing toolbar 28, it should be appreciated that in alternative embodiments, the toolbar assembly 14 may include additional wing toolbars. For example, in certain embodiments, the toolbar assembly 14 may include 2, 4, 6, 8, or more wing toolbars. In addition, while hydraulic actuators (e.g., hydraulic cylinders) are disclosed herein, it should be appreciated that the wheel actuators 52, 60, and 66, the first and second wing actuators 72 and 74, and the wing support actuators 80 and 84 may include pneumatic actuators (e.g., pneumatic cylinders, pneumatic motors, etc.), electric actuators (e.g., solenoids, electric motors, etc.), or any other suitable actuator in alternative embodiments.

Figure 2:
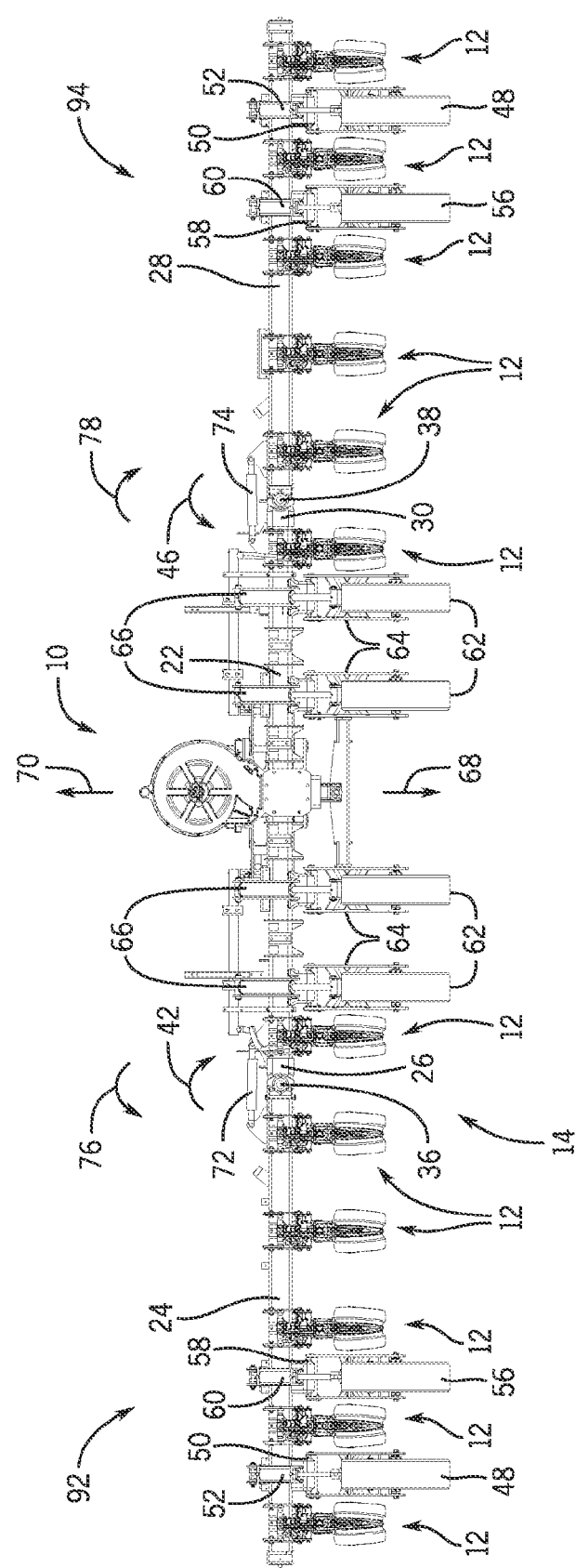
FIG. 2 is a rear view of the agricultural implement system of FIG. 1, in which a toolbar assembly is in a raised/non-working position.

FIG. 2 is a rear view of the agricultural implement system 10 of FIG. 1, in which the toolbar assembly 14 is in the raised/non-working position. With the toolbar assembly 14 in the raised/non-working position, the row units 12 (e.g., ground-engaging elements of the row units, such as gauge wheels, openers, closing discs, packers wheels, etc.) are disengaged from the soil. Disengaging the row units 12 from the soil enables the agricultural implement system 10 to turn at a headland and/or to transition the wing toolbars and the wing supports to the transport position. Furthermore, with the toolbar assembly 14 in the raised/non-working position, the first wheels 48, the second wheels 56, and the third wheels 62 engage the soil surface, thereby distributing the weight of the agricultural implement system 10 among each of the ground-engaged wheels.

Figure 3:
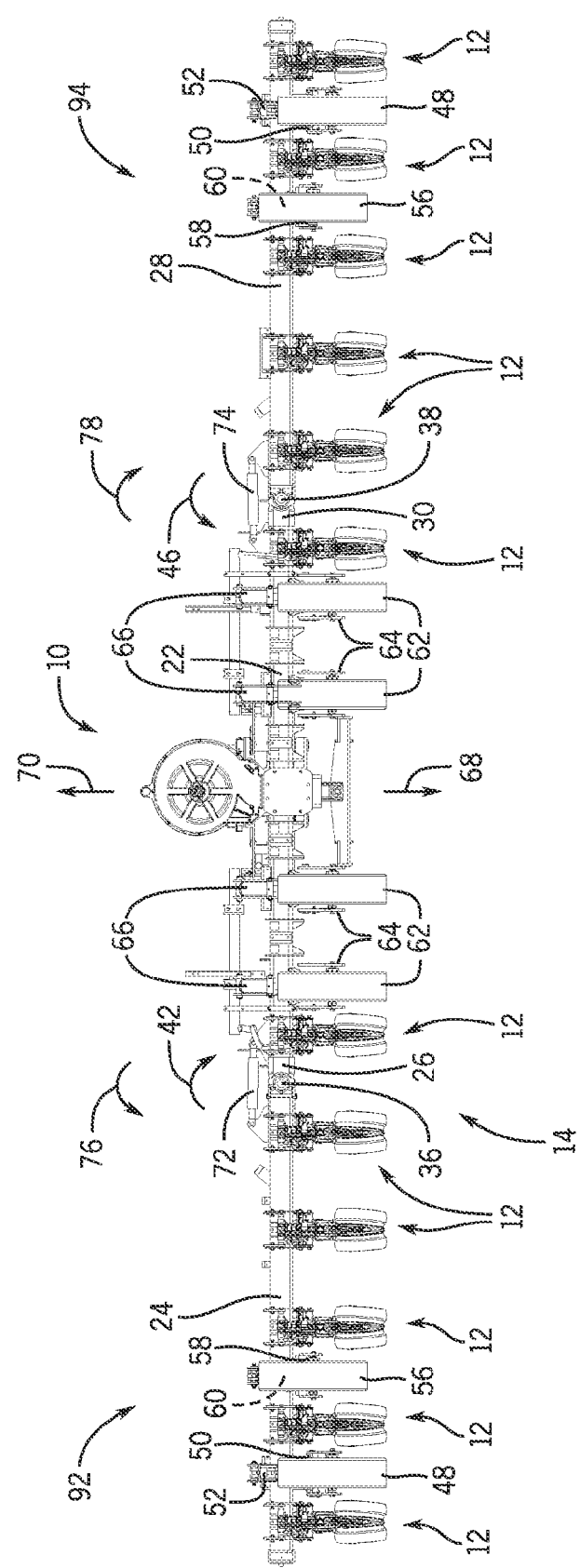
FIG. 3 is a rear view of the agricultural implement system of FIG. 1, in which the toolbar assembly is in a lowered/working position.

FIG. 3 is a rear view of the agricultural implement system 10 of FIG. 1, in which the toolbar assembly 14 is in a lowered/working position. With the toolbar assembly 14 in the lowered/working position, the row units 12 (e.g., ground-engaging elements of the row units, such as gauge wheels, openers, closing discs, packers wheels, etc.) engage the soil, thereby facilitating seeding operations. Furthermore, with the toolbar assembly 14 in the lowered/working position, the first wheels 48 and the third wheels 62 engage the soil surface. However, as illustrated, the second wheels 56 are raised above the first wheels 48 and the third wheels 62 such that the second wheels 56 are disengaged from the soil surface. Because the second wheels 56 are disengaged from the soil surface while the toolbar assembly 14 is in the working position, soil compaction on both lateral sides of each row unit positioned between a pair of adjacent first and second wheels may be substantially reduced or eliminated. Accordingly, the crop yield from the seeds planted by such row units may be increased. As a result, the overall seeding efficiency of the agricultural implement system may be enhanced. As discussed in detail below, the second wheels 56 may be lowered into engagement with the soil surface while a soil softness exceeds a soil softness threshold value. As a result, the possibility of the first wheels 48, the third wheels 62, and the row units 12 sinking into soft soil may be substantially reduced.

Figure 4:
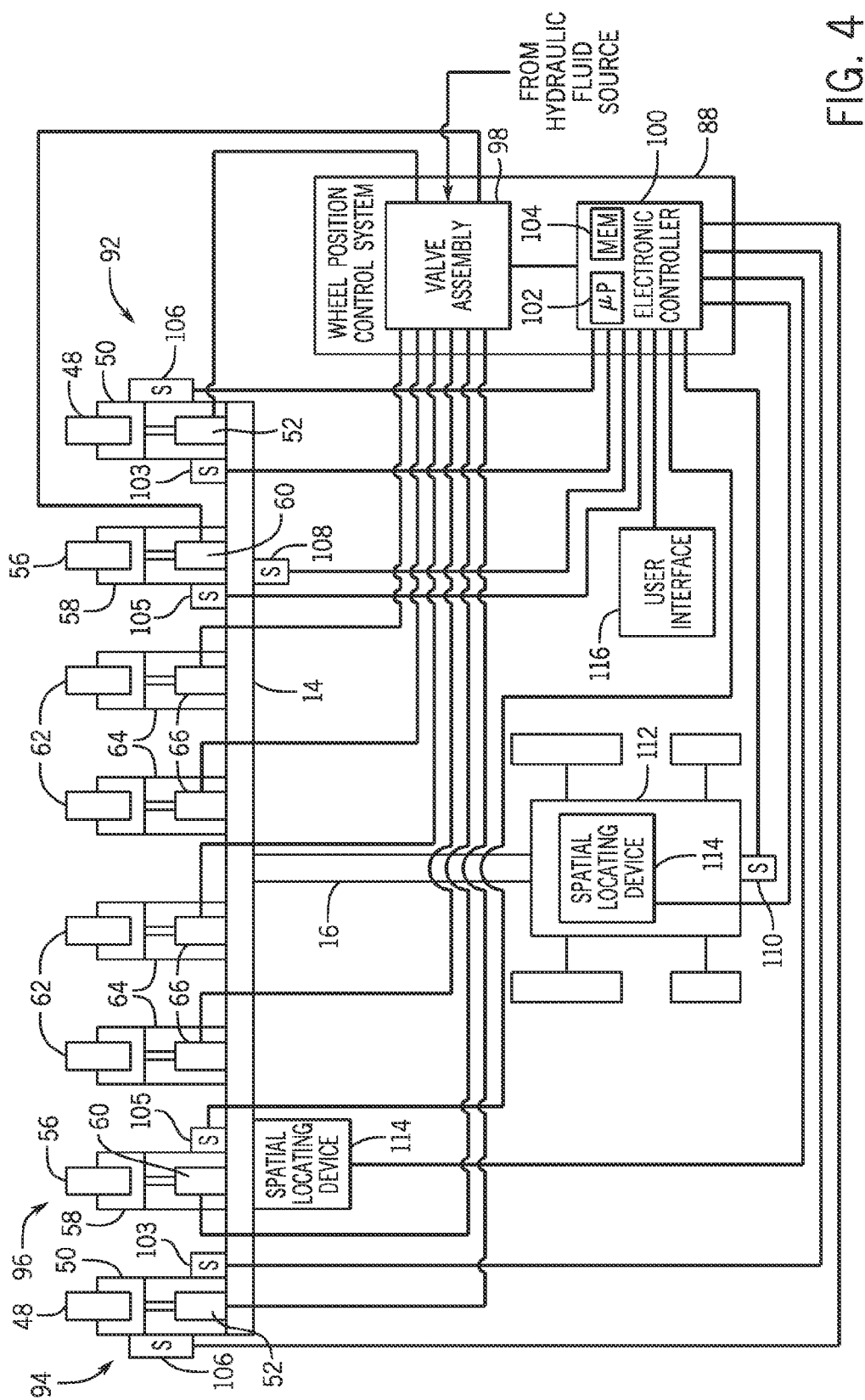
FIG. 4 is a schematic view of a control system that may be employed within the agricultural implement system of FIG. 1.

FIG. 4 is a schematic view of a control system 96 that may be employed within the agricultural implement system of FIG. 1. As illustrated, the control system 96 includes the first wheel actuators 52, the second wheel actuators 60, and the third wheel actuators 66. As previously discussed, the first wheel actuators 52 are configured to move the first wheels 48 relative to the toolbar assembly 14. In addition, the second wheel actuators 60 are configured to move the second wheels 56 relative to the toolbar assembly 14. Furthermore, the third wheel actuators 66 are configured to move the third wheels 62 relative to the toolbar assembly 14. While each actuator is a hydraulic cylinder in the illustrated embodiment, it should be appreciated that in alternative embodiments, one or more of the actuators may be a hydraulic motor, a pneumatic cylinder, an electromechanical actuator, or any other suitable type of actuator.

In the illustrated embodiment, each actuator is fluidly coupled to a valve assembly 98 of the wheel position control system 88. The valve assembly 98 is configured to control fluid flow between a hydraulic fluid source and the actuators. However, it should be appreciated that in embodiments in which the actuators are pneumatic actuators, the valve assembly 98 may be configured to control fluid flow between a pneumatic fluid source and the actuators. Furthermore, in embodiments in which the actuators are electromechanical actuators, the valve assembly may be omitted, and the actuators may be control via electronic signals from the wheel position control system.

In the illustrated embodiment, the wheel position control system 88 includes an electronic controller 100 communicatively coupled to the valve assembly 98. The electronic controller 100 includes a processor, such as the illustrated microprocessor 102, and a memory device 104. The electronic controller 100 may also include one or more storage devices and/or other suitable components. The processor 102 may be used to execute software, such as software for controlling the valve assembly 98, and so forth. Moreover, the processor 102 may include multiple microprocessors, one or more "general-purpose" microprocessors, one or more special-purpose microprocessors, and/or one or more application specific integrated circuits (ASICS), or some combination thereof. For example, the processor 102 may include one or more reduced instruction set (RISC) processors.

The memory device 104 may include a volatile memory, such as random access memory (RAM), and/or a nonvolatile memory, such as ROM. The memory device 104 may store a variety of information and may be used for various purposes. For example, the memory device 104 may store processor-executable instructions (e.g., firmware or software) for the processor 102 to execute, such as instructions for controlling the valve assembly 98. The storage device(s) (e.g., nonvolatile storage) may include read-only memory (ROM), flash memory, a hard drive, or any other suitable optical, magnetic, or solid-state storage medium, or a combination thereof. The storage device(s) may store data, instructions (e.g., software or firmware for controlling the valve assembly 98, etc.), and any other suitable information.

In the illustrated embodiment, the electronic controller 100 is configured to instruct the wheel actuators 52, 60, and 66 (e.g., via the valve assembly 98) to control the position of the wheels 48, 56, and 62 relative to the toolbar assembly 14. For example, the electronic controller 100 may instruct the first actuator 52, the second actuator 60, and the third actuator 66 to lower the first wheels 48, the second wheels 56, and the third wheels 62, respectively, to move the toolbar assembly 14 to the non-working position, in which the first, second, and third wheels 48, 56, and 62 engage the soil surface and the row units are disengaged from the soil surface. In addition, the electronic controller 100 may instruct the first, second, and third actuators 52, 60, and 66 to raise the first, second, and third wheels 48, 56, and 62 to move the toolbar assembly 14 to the working position, in which the first and third wheels 48 and 62 engage the soil surface and the row units engage the soil surface. The electronic controller 100 may also instruct the second actuators 60 to raise the second wheels 56 above the first wheels 48 while the toolbar assembly 14 is in the working position such that the second wheels 56 are disengaged from the soil surface. Accordingly, soil compaction on both lateral sides of each row unit positioned between a pair of adjacent first and second wheels may be substantially reduced or eliminated, thereby increasing the crop yield from seeds planted by such row units.

In certain embodiments, the electronic controller 100 is configured to selectively instruct the second actuators 60 to lower the second wheels 56 into engagement with the soil surface while the toolbar assembly 14 is in the working position and a soil softness exceeds a soil softness threshold value. As a result, the possibility of the first wheels 48, the third wheels 62, and the row units 12 sinking into soft soil may be substantially reduced. When the soil softness decreases below the threshold value, the electronic controller 100 may instruct the second actuators 60 to raise the second wheels 56 above the first wheels 48, thereby disengaging the second wheels 56 from the soil surface.

In the illustrated embodiment, the control system 96 includes two angle sensors 103 (e.g., rotary potentiometers, linear potentiometers, linear variable differential transforms (LVDTs), etc.) communicatively coupled to the electronic controller 100. Each angle sensor 103 is configured to output a signal indicative of an angle of the respective first wheel frame 50 relative to the toolbar assembly 14. The electronic controller 100 is configured to receive the signal indicative of the angle from each angle sensor 103 and to determine the soil softness based on the signal. For example, a larger angle between the first wheel frame 50 and the toolbar assembly 14 may indicate that the first wheel 48 is sinking into softer soil. Accordingly, the electronic controller 100 may associate a larger angle with softer soil. Conversely, the electronic controller 100 may associate a smaller angle with harder soil. If at least one sensor 103 outputs a signal indicative of an angle greater than a soil softness threshold angle (e.g., stored within the memory device 104), the electronic controller 100 may instruct the second actuators 60 to lower the second wheels 56 into engagement with the soil surface, thereby reducing the penetration depth of the first wheels 48 and/or the third wheels 62 into the soil.

In certain embodiments, the wheel position control system 88 may be configured to independently control each second actuator 60 based on a respective signal from the angle sensor 103 associated with the adjacent first wheel frame 50. For example, if the angle of only one first wheel frame 50 (e.g., on the left lateral portion 92 of the agricultural implement system 10) is greater than the soil softness threshold angle, the electronic controller 100 may instruct only the second actuator 60 coupled to the adjacent second wheel frame 58 (e.g., on the left lateral portion 92 of the agricultural implement system 10) to lower the second wheel 56 into engagement with the soil surface. As a result, the other second wheel 56 (e.g., on the right lateral portion 94 of the agricultural implement system 10) may remain in the raised/disengaged position, thereby reducing compaction on both lateral sides of the row unit positioned between the other second wheel 56 and the adjacent first wheel 48. While an angle sensor 103 is configured to monitor the angle of each first wheel frame 50 in the illustrated embodiment, it should be appreciated that in alternative embodiments, a single angle sensor 103 may be configured to monitor the angle of one first wheel frame 50. In addition, it should be appreciated that in certain embodiments, one or more angle sensors may be configured to monitor the angle of one or more respective third wheel frames 64 (e.g., in addition to the first wheel frame angle sensor(s), or as an alternative to the first wheel frame angle sensor(s)).

Furthermore, the electronic controller 100 may be configured to instruct the second actuators 60 to control a down force on the second wheels 56 based on the soil softness while the soil softness exceeds the soil softness threshold value. Accordingly, the second wheels 56 may apply a force to the soil surface sufficient to reduce the possibility of the first wheels 48, the third wheels 62, and the row units sinking into the soil, while substantially reducing soil compaction on both lateral sides of each row unit positioned between a pair of adjacent first and second wheels. In certain embodiments, the electronic controller 100 may control the down force on the second wheels 56 based on feedback from second angle sensors 105. Each angle sensor 105 is configured to output a signal indicative of an angle of the second wheel frame 58 relative to the toolbar assembly 14. As illustrated, each second angle sensor 105 is communicatively coupled to the electronic controller 100. In certain embodiments, the electronic controller 100 may be configured to adjust the down force applied to the second wheels 56 until the angle of the second wheel frames 58 relative to the toolbar assembly 14 are substantially equal to the angle of the first wheel frames 50 relative to the toolbar assembly 14 (e.g., until the difference between the angles is less than a threshold value). Furthermore, the down force applied by each second wheel 56 may be independently controlled (e.g., such that the angle of each second wheel frame 58 is substantially equal to the angle of the adjacent first wheel frame 50). In addition, it should be appreciated that in certain embodiments, the control system 96 may include a single second angle sensor 105 coupled to one second wheel frame 58.

In the illustrated embodiment, the control system 96 includes two load sensors 106 communicatively coupled to the electronic controller 100. Each load sensor 106 is configured to output a signal indicative of a load on the respective first wheel 48. The electronic controller 100 is configured to receive the signal indicative of the load from each load sensor 106 and to determine the soil softness based on the signal. For example, a larger force applied to the first wheels 48 may indicate that the row units are sinking into softer soil, thereby causing the first wheels 48 to support a larger portion of the weight of the toolbar assembly 14. Accordingly, the electronic controller 100 may associate a larger force on the first wheels 48 with softer soil. Conversely, the electronic controller 100 may associate a smaller force on the first wheels 48 with harder soil. If at least one sensor 106 outputs a signal indicative of a force greater than a soil softness threshold force (e.g., stored within the memory device 104), the electronic controller 100 may instruct the second actuators 60 to lower the second wheels 56 into engagement with the soil surface, thereby reducing the load on the first wheels 48. For example, the electronic controller 100 may be configured to adjust the down force applied to the second wheels 56 until the load on the first wheels 48 is reduced below the soil softness threshold force.

In certain embodiments, the wheel position control system 88 may be configured to independently control each second actuator 60 based on a respective signal from the load sensor 106 associated with the adjacent first wheel 48. For example, if the load on only one first wheel 48 (e.g., on the left lateral portion 92 of the agricultural implement system 10) is greater than the soil softness threshold load, the electronic controller 100 may instruct only the second actuator 60 coupled to the adjacent second wheel frame 58 (e.g., on the left lateral portion 92 of the agricultural implement system 10) to lower the second wheel 56 into engagement with the soil surface. As a result, the other second wheel 56 (e.g., on the right lateral portion 94 of the agricultural implement system 10) may remain in the raised/disengaged position, thereby reducing soil compaction on both lateral sides of the row unit positioned between the other second wheel 56 and the adjacent first wheel 48. While a load sensor 106 is configured to monitor the load on each first wheel 48 in the illustrated embodiment, it should be appreciated that in alternative embodiments, a single load sensor 106 may be configured to monitor the load on one first wheel 48. In addition, it should be appreciated that in certain embodiments, one or more load sensors may be configured to monitor the load on one or more respective third wheels 62 (e.g., in addition to the first wheel load sensor(s), or as an alternative to the first wheel load sensor(s)).

As will be appreciated, each load sensor 106 may include any suitable device for monitoring the load on the respective first wheel 48. For example, in certain embodiments, the load sensor 106 may include a strain gauge coupled to the first wheel frame 50 and configured to monitor the deflection of the first wheel frame 50 under a load. In further embodiments, the load sensor 106 may include a load cell (e.g., piezoelectric load cell, etc.) disposed between the first wheel 48 and the first wheel frame 50, and configured to directly monitor the load on the first wheel 48. In certain embodiments, the electronic controller 100 may also be configured to instruct the second actuators 60 to lower the second wheels 56 into engagement with the soil surface if the force applied to the first wheels 48 exceeds a second threshold value indicative of a maximum desired load on the first wheel frames 50. In further embodiments, one or more strain gauges may be coupled to the toolbar assembly and configured to monitor a bending load on the toolbar assembly. In such embodiments, the electronic controller may be configured to instruct the second actuators to lower the second wheels into engagement with the soil surface if the bending load exceeds a threshold value indicative of a maximum desired bending load on the toolbar assembly.

In certain embodiments, the control system 96 includes a first soil sensor 108 mounted on the agricultural implement system (e.g., on the toolbar assembly 14, on the tow bar assembly 16, etc.) and configured to output a signal indicative of the soil softness. Furthermore, in certain embodiments, the control system 96 includes a second soil sensor 110 mounted to a vehicle 112 (e.g., tractor) configured to tow the agricultural implement system, and configured to output a signal indicative of the soil softness. The electronic controller 100 is configured to receive the signals from the soil sensors 108 and 110, and to instruct the second actuators 60 to lower the second wheels 56 into engagement with the soil surface if the soil softness is greater than a soil softness threshold value (e.g., stored within the memory device 104). The electronic controller 100 may also be configured to instruct the second actuators 60 to control a down force on the second wheels 56 based on the soil softness while the soil softness exceeds the soil softness threshold value.

As will be appreciated, each soil sensor may include any suitable type of sensor configured to output a signal indicative of soil softness. For example, the soil sensor may include a contact sensor configured to engage the soil and to monitor a load applied to the sensor. In addition, the soil sensor may include a non-contact sensor, such as an acoustic analyzer, an optical analyzer, an electromagnetic analyzer, or a combination thereof. For example, the non-contact sensor (e.g., acoustic analyzer, optical analyzer, electromagnetic analyzer, etc.) may send and/or receive energy from the agricultural field to measure certain properties of the soil, such as water/moisture content, soil profile, soil type, or a combination thereof, among other soil properties. For example, soil with a higher water/moisture content may be softer than soil with a lower water/moisture content. Accordingly, the non-contact sensor may output a signal indicative of soil softness. In further embodiments, other suitable types of sensor (e.g., chemical analyzers, soil penetrometers, etc.) may be utilized. Furthermore, it should be appreciated that the control system 96 may include more or fewer soil sensors (e.g., 1, 2, 3, 4, 5, 6, or more). For example, in certain embodiments, the first soil sensor 108 or the second soil sensor 110 may be omitted.

In certain embodiments, the electronic controller 100 is configured to determine the soil softness based on a position of the agricultural implement system and a field condition map (e.g., stored within the memory device 104). For example, in the illustrated embodiment, the control system 96 includes a first spatial locating device 114 (e.g., global positioning system (GPS) receiver) coupled to the agricultural implement system (e.g., to the toolbar assembly 14, to the tow bar assembly 16, etc.) and a second spatial locating device 114 coupled to the tow vehicle 112. However, it should be appreciated that in alternative embodiments, the control system may have more or fewer spatial locating devices (e.g., only one spatial locating device coupled to the agricultural implement system, only one spatial locating device coupled to the tow vehicle 112, etc.). The field condition map may include two-dimensional data that maps a location within the field to soil softness (e.g., measured by one or more soil sensors during a previous pass through the field). The electronic controller 100 may determine the soil softness by locating the position of the agricultural implement system (e.g., as determined by the spatial locating devices 114) on the soil condition map and receiving the soil softness at that location. If the soil softness is greater than the soil softness threshold value, the electronic controller 100 may instruct the second actuators 60 to lower the second wheels 56 into engagement with the soil surface. The electronic controller 100 may also be configured to instruct the second actuators 60 to control a down force on the second wheels 56 based on the soil softness while the soil softness exceeds the soil softness threshold value. While the illustrated embodiment includes angle sensors 103 and 105, load sensors 106, soil sensors 108 and 110, and spatial locating devices 114, it should be appreciated that in alternative embodiments, one or more of these elements may be omitted.

In the illustrated embodiment, the control system 96 includes a user interface 116 communicatively coupled to the electronic controller 100. The user interface 116 may enable a user to provide manual inputs to the electronic controller 100. For example, in certain embodiments, the electronic controller 100 may selectively instruct the second actuators 60 to lower the second wheels 56 into engagement with the soil surface in response to a manual input from the user interface 116. In addition, the electronic controller 100 may instruct the second actuators 60 to control the down force on the second wheels 56 based on a manual input from the user interface 116.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
   a toolbar assembly configured to support a plurality of row units;
   a plurality of wheels configured to support the toolbar assembly above a soil surface, wherein the plurality of wheels comprises a first wheel and a second wheel, and at least one row unit of the plurality of row units is configured to be disposed between the first wheel and the second wheel;
   a wheel position control system configured to control movement of each wheel of the plurality of wheels relative to the toolbar assembly, wherein the wheel position control system is configured to instruct a first actuator and a second actuator to lower the first wheel and the second wheel, respectively, relative to the toolbar assembly to transition the agricultural implement system to a non-working position, in which the first and second wheels engage the soil surface and the plurality of row units is disengaged from the soil surface, the wheel position control system is configured to instruct the first actuator and the second actuator to raise the first wheel and the second wheel, respectively, relative to the toolbar assembly to transition the agricultural implement system to a working position, in which the first wheel engages the soil surface and the plurality of row units engages the soil surface, and the wheel position control system is configured to instruct the second actuator to raise the second wheel above the first wheel relative to the toolbar assembly while the agricultural implement system is in the working position such that the second wheel is disengaged from the soil surface, and
   an angle sensor configured to output a signal indicative of an angle of a first wheel frame relative to the toolbar assembly, wherein the first wheel frame is rotatable relative to the toolbar assembly and configured to support the first wheel, and the wheel position control system is configured to determine the soil softness based on the signal,
   wherein the wheel position control system is configured to selectively instruct the second actuator to lower the second wheel into engagement with the soil surface while the agricultural implement system is in the working position and a soil softness exceeds a soil softness threshold value.

2. The agricultural implement system of claim 1, comprising a load sensor configured to output a signal indicative of a load on the first wheel, wherein the wheel position control system is configured to determine the soil softness based on the signal.

3. The agricultural implement system of claim 1, comprising a soil sensor mounted on the agricultural implement system or on a vehicle configured to tow the agricultural implement system, wherein the soil sensor is configured to output a signal indicative of the soil softness to the wheel position control system.

4. The agricultural implement system of claim 1, wherein the wheel position control system is configured to determine the soil softness based on a position of the agricultural implement system and a field condition map.

5. The agricultural implement system of claim 1, wherein the wheel position control system is configured to instruct the second actuator to control a down force on the second wheel based on the soil softness while the soil softness exceeds the soil softness threshold value.

6. The agricultural implement system of claim 1, wherein the second wheel is positioned closer to a centerline of the agricultural implement system than the first wheel, and the centerline extends along a direction of travel of the agricultural implement system between left and right lateral portions of the agricultural implement system.

7. The agricultural implement system of claim 1, wherein the wheel position control system is configured to selectively instruct the second actuator to lower the second wheel while the agricultural implement system is in the working position in response to a manual input.

8. The agricultural implement system of claim 1, wherein only one row unit of the plurality of row units is configured to be disposed between the first wheel and the second wheel.

9. An agricultural implement system, comprising:
a wheel position control system configured to control respective positions of a first wheel and a second wheel of the agricultural implement system, wherein the first wheel is positioned on a first side of at least one row unit, the second wheel is positioned on a second side of the at least one row unit, opposite the first side, the first and second wheels are configured to support a toolbar assembly, and the at least one row unit is coupled to the toolbar assembly;
wherein the wheel position control system comprises an electronic controller configured to instruct a first actuator and a second actuator to lower the first wheel and the second wheel, respectively, to transition the agricultural implement system to a non-working position, in which the first and second wheels engage a soil surface and the at least one row unit is disengaged from the soil surface, the electronic controller is configured to instruct the first and second actuators to raise the first and second wheels, respectively, to transition the agricultural implement system to a working position, in which the first wheel engages the soil surface and the at least one row unit engages the soil surface, and the electronic controller is configured to instruct the second actuator to raise the second wheel above the first wheel while the agricultural implement system is in the working position such that the second wheel is disengaged from the soil surface,
wherein the electronic controller is configured to receive a signal from an angle sensor indicative of a soil softness, and the electronic controller is configured to instruct the second actuator to lower the second wheel into engagement with the soil surface while the agricultural implement system is in the working position and the soil softness exceeds a soil softness threshold value, and
wherein the signal indicative of the soil softness is received from the angle sensor configured to monitor an angle of a first wheel frame relative to the toolbar assembly.

10. The agricultural implement system of claim 9, wherein the first wheel frame is rotatable relative to the toolbar assembly and configured to support the first wheel.

11. The agricultural implement system of claim 9, wherein the electronic controller is configured to instruct the second actuator to control a down force on the second wheel based on the soil softness while the soil softness exceeds the soil softness threshold value.

12. The agricultural implement system of claim 9, wherein the electronic controller is configured to determine a soil softness based on a position of the agricultural implement system and a field condition map, and the electronic controller is configured to instruct the second actuator to lower the second wheel into engagement with the soil surface while the agricultural implement system is in the working position and the soil softness exceeds a soil softness threshold value.

13. An agricultural implement system, comprising:
a toolbar assembly configured to support a plurality of row units;
a first wheel configured to support the toolbar assembly above a soil surface;
a first wheel frame rotatably coupled to the toolbar assembly and configured to support the first wheel;
a first actuator configured to adjust a first angle of the first wheel frame relative to the toolbar assembly;
a second wheel configured to support the toolbar assembly above the soil surface, wherein at least one row unit of the plurality of row units is positioned between the first wheel and the second wheel;
a second wheel frame rotatably coupled to the toolbar assembly and configured to support the second wheel;
a second actuator configured to adjust a second angle of the second wheel frame relative to the toolbar assembly;
a wheel position control system comprising an electronic controller, wherein the electronic controller is configured to instruct the first actuator and the second actuator to lower the first wheel and the second wheel, respectively, relative to the toolbar assembly to transition the agricultural implement system to a non-working position, in which the first and second wheels engage the soil surface and the at least one row unit is disengaged from the soil surface, the electronic controller is configured to instruct the first and second actuators to raise the first and second wheels, respectively, relative to the toolbar assembly to transition the agricultural implement system to a working position, in which the first wheel engages the soil surface and the at least one row unit engages the soil surface, and the electronic controller is configured to instruct the second actuator to raise the second wheel above the first wheel while the agricultural implement system is in the working position such that the second wheel is disengaged from the soil surface, and an angle sensor communicatively coupled to the electronic controller, wherein the angle sensor is configured to output a signal indicative of a soil softness, and the electronic controller is configured to instruct the second actuator to lower the second wheel into engagement with the soil surface while the agricultural implement system is in the working position and the soil softness exceeds a soil softness threshold value.

14. The agricultural implement system of claim 13, wherein the second wheel frame is positioned closer to a centerline of the agricultural implement system than the first wheel frame, and the centerline extends along a direction of travel of the agricultural implement system between left and right lateral portions of the agricultural implement system.

15. The agricultural implement system of claim 13, comprising a user interface communicatively coupled to the electronic controller, wherein the electronic controller is configured to selectively lower the second wheel while the agricultural implement system is in the working position in response to a manual input from the user interface.

16. The agricultural implement system of claim 13, wherein only one row unit of the plurality of row units is positioned between the first wheel and the second wheel.

* * * * *